Patented Mar. 2, 1926.

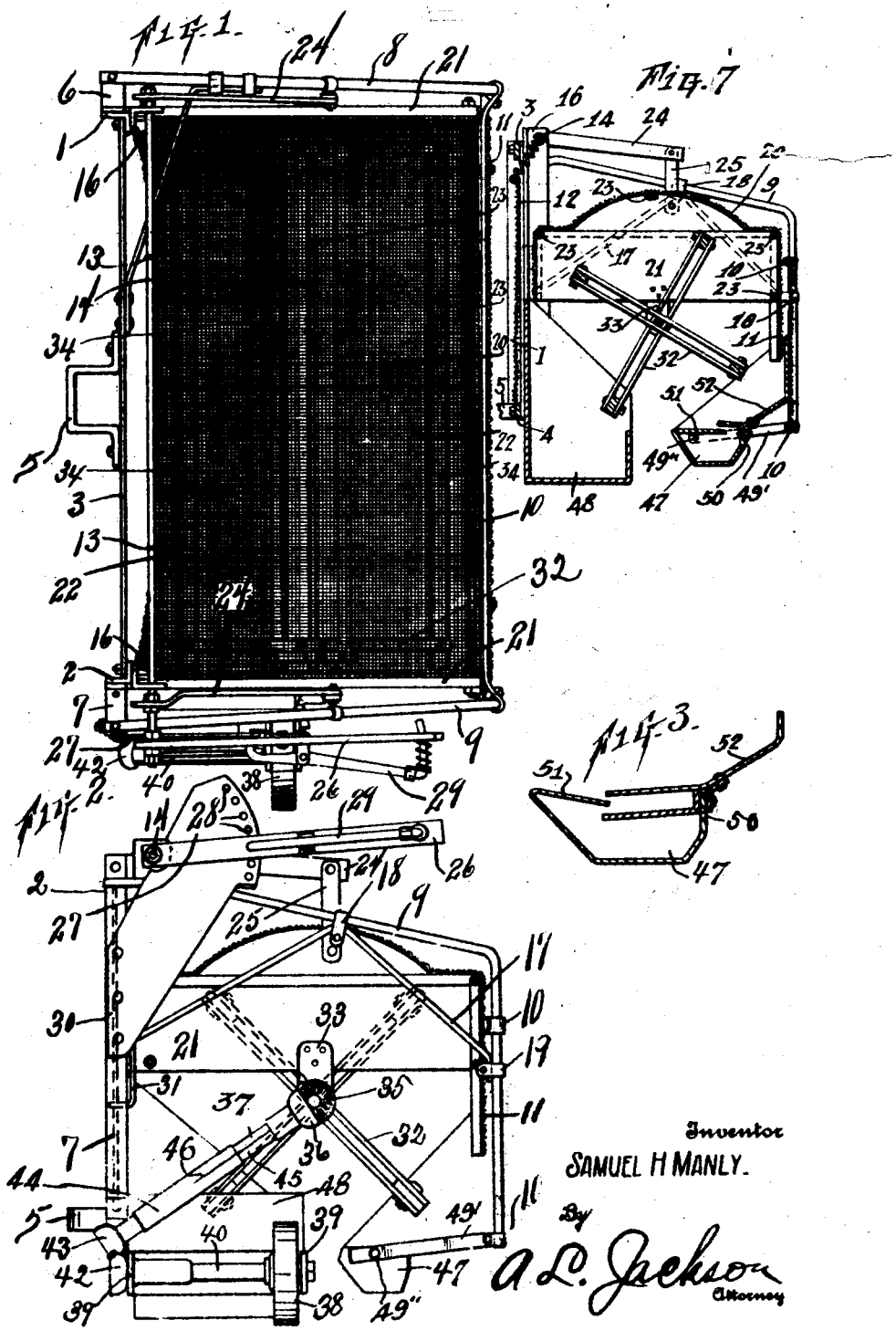

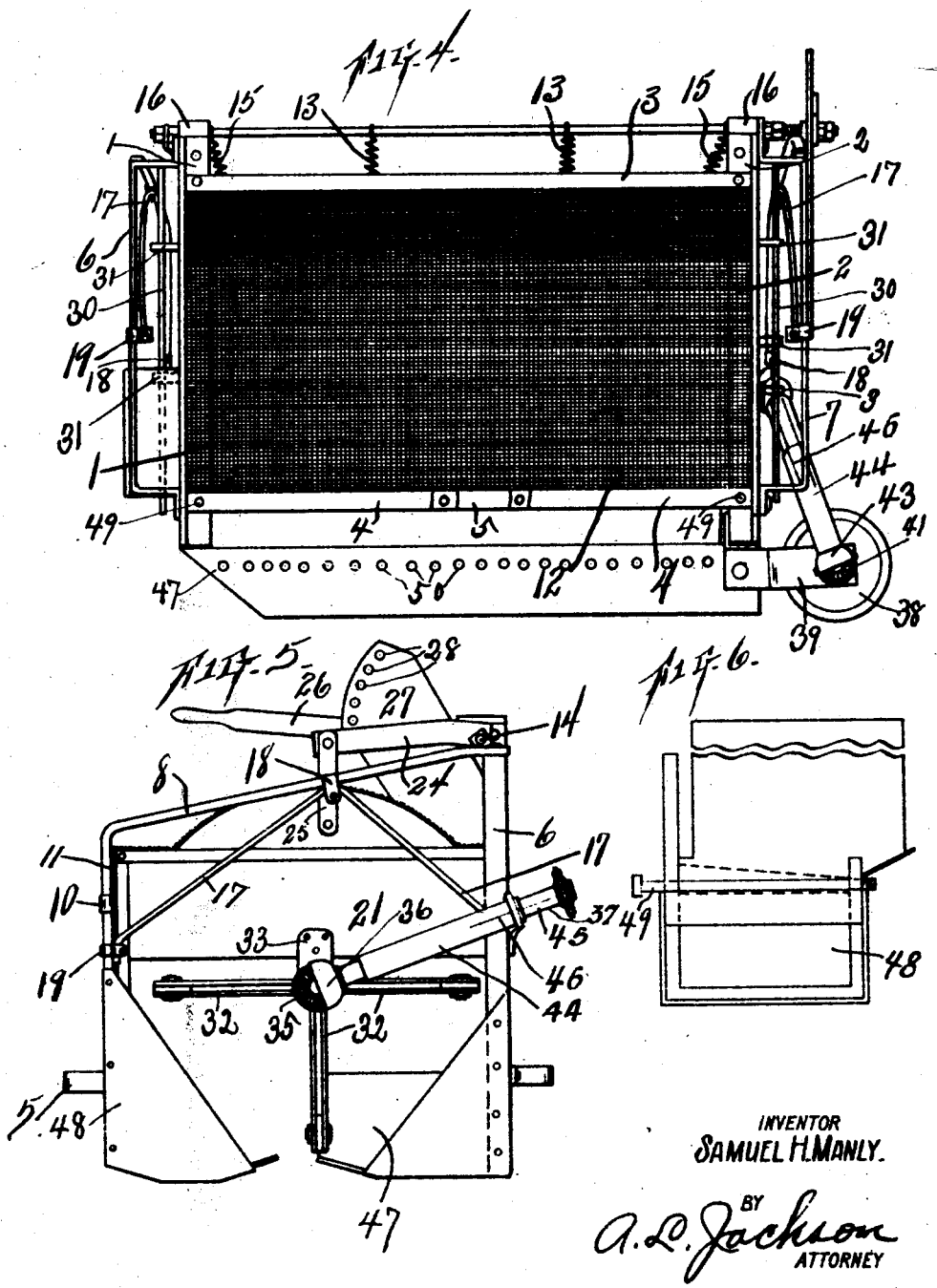

1,575,072

UNITED STATES PATENT OFFICE.

SAMUEL H. MANLY, OF GRANBURY, TEXAS.

INSECT-DESTROYING MACHINE.

Application filed September 15, 1923. Serial No. 662,800.

*To all whom it may concern:*

Be it known that I, SAMUEL H. MANLY, a citizen of the United States, residing at Granbury, in the county of Hood and State of Texas, have invented certain new and useful Improvements in Insect-Destroying Machines, of which the following is a specification.

My invention relates to insect destroying machines; and the object is to provide a simple device for destroying insects and particularly boll weevils which destroy cotton crops, to provide a simple device which may be carried on a cultivator beam, to provide a simple device which can be furnished at a small cost, and which is simple in operation and may be automatically operated by the cultivator on which it is mounted. The object is also to provide a machine which can be efficiently used during the first fruiting of the cotton and at all other times during the fruiting of the cotton. It is known that boll weevils begin to infest the cotton plants when they are very small. As soon as the boll weevils come out of hibernation they begin their work on young cotton even before cotton begins to bloom. One of the objects is to provide a machine which can be used on very small cotton, so that the boll weevil can be destroyed before it deposits the first eggs. Other objects and advantages will be fully explained in the following description and the invention will be more particularly pointed out in the claims.

Reference is had to the accompanying drawings which form a part of this application.

Fig. 1 is a plan view of the improved insect destroyer. Fig. 2 is a rear elevation of the same. Fig. 3 is a vertical section of one of the pans for catching the insects. Fig. 4 is a side elevation of the machine. Fig. 5 is a front elevation of the machine, showing a variation in the driving means. Fig. 6 is a detail view of the insect catching pan on the left side. Fig. 7 is a vertical cross-section of Fig. 1.

Similar characters of reference are used to indicate the same parts throughout the several views.

This machine is provided with a frame composed of uprights 1 and 2 for the left side thereof and a longitudinal bar 3 is bolted to these uprights at their upper ends. A longitudinal bar 4 is bolted to the lower ends of these uprights to complete the frame on the left side and to form a hanger bar for attaching the insect destroying machine to a cultivator beam. A coupler bracket 5 is attached to the bar 4 for attaching the machine to a cultivator beam of ordinary type.

The insect destroyer is to be attached to different types of cultivators and brackets 5 or other attaching devices may be used. The rear part of the destroyer carries a roller 38 which may drive the reel 32.

A supplemental frame, consisting of bracket frame members 6 and 7, is attached respectively to uprights 1 and 2. Angular frame members 8 and 9 are riveted to the bracket frame members 6 and 7 and extended at inclines to the right side of the machine and then vertically downward to form upright frame members for the right side of the machine. Longitudinal frame bars 10 are attached to the upper and lower parts of the members 8 and 9 and a screen 11 is attached to the bars 10. A screen 12 is attached to the lower parts of the uprights 1 and 2 and the upper edge of the screen is attached to and suspended from the pivot bar 14 by springs 13 and the pivot bar 14 is journaled in bearing brackets 16 which are attached to uprights 1 and 2. The screen 12 is further suspended by springs 15 which are attached to the screen and to the brackets 16 for supporting the screen yieldingly. The angular bars 8 and 9 are provided with braces 17 which are attached to these bars by clips 18 and these braces are also attached to the upright frame members 6 and 7 by brackets 19. This structure makes a reasonably rigid frame and forms a longitudinal channel therethrough for passing on each side of a row of cotton plants.

A vertically movable screen covered hood 20 is mounted within the frame above described and movable vertically between the screens 11 and 12. This hood is composed of solid end pieces 21 (which may be of wood or other suitable material) and a single piece of screen forms the sides and top of the hood, the screen being curved upwardly in the central part and then bent downwardly on each side, and attached to the upper edges of the end pieces 21. The screen 20 is provided with longitudinal frame pieces 23. The hood is thus an inverted box-like structure. Means are provided for raising and lowering the hood to adapt the same for cotton stalks of different heights. Arms 24 are rigid with the pivot bar 14 and links 25 are pivotally connected to the arms 24 and hang downwardly and are pivotally connected to the members 21 of the hood. A lever 26 is rigid with the pivot bar 14. A sector 27 is rigidly attached to the frame member 7 and provided with a plurality of holes 28. A spring dog 29 is carried by the lever 26 and is adapted to enter any one of the holes 28 in the sector or standard 27 for holding the hood at different heights.

The hood 21 is guided in its up and down motion by rods 30 and by the perforated arms 31 which are attached to the hood 21. The arms 31 are perforated to receive the guide rods 30. When the hood 21 is moved vertically by the lever 26, the hood will be guided by the rods 30. A reel 32 is carried by the hood 21 by means of bearings 33 in which the reel is journaled. Bearings 33 are supported by brackets attached to the hood 21. The reel 32 has longitudinal bars or members 34 for agitating the cotton plants for the purpose of shaking the insects down or off the cotton. The reel is driven by a bevel gear wheel 35 and gear wheel 35 is driven by a bevel gear wheel carried in the hood 36. The hood 36 and the gear wheel therein are carried by a telescopic shaft member 37. A wheel 38 is journaled in bearings 39 which are pivotally connected with upright 2. The wheel 38 with its shaft 40 drives a bevel gear wheel 41 which is inclosed partly in a hood 42 and the wheel 41 drives a gear wheel which is carried in the swinging hood 43 and the gear in hood 43 drives a telescopic shaft 44. The shaft members 37 and 44 telescope and have square portions 45 and 46, the part 46 telescoping into part 45. The gearing is thus adapted to drive the reel 32 at any ordinary height.

The insects are shaken from the plants and they fall into trap pans or troughs 47 and 48. The pan 47 is hung on the machine frame by bars 49' and bolts 49" as shown in Fig. 2 so that the pan will be detachable. The pan 48 is also detachably mounted by removable bolts 49 so that the insects can be removed. The pans are provided with tops which are in three parts, as shown in Fig. 3, and the parts are so arranged as to make a zig zag entrance and the parts 51 and 52 are inclined so that the insects will slide down into the pans. On the opposite side from the entrance into the pan, there are perforations 50 for light but the perforations are not large enough for insects to escape. The three part entrance will be dark so that the insects will not go back or try to go back through the entrance. The insects are thus trapped in the pans. The insects may be destroyed in any convenient manner.

The parallel relation of the cultivator beams aids in the control and operation of the insect gathering device. The heavy springs at the connection of the cultivator beam with the cultivator frame sustain a considerable part of the weight of the insect gatherers and thus make less to be supported by the wheel 38.

What I claim is:—

1. An insect destroying machine comprising a hanger frame provided with screen side members forming a longitudinal channel, a rod journaled in one side of said frame and provided with arms rigid therewith and projecting approximately horizontally therefrom, a screen hood suspended from said arms, a lever rigid with said rod for raising and lowering said hood, a rack for holding said lever at different adjustments, vertical guides for said hood, a reel journaled in said hood, means for driving said reel, and trap pans below said reel for catching insects.

2. An insect destroying machine comprising a hanger frame provided with screen side members forming a longitudinal channel, a rod journaled in one side of said frame and provided with arms rigid therewith and projecting approximately horizontally therefrom, a screen hood suspended from said arms, a lever rigid with said rod for raising and lowering said hood, a rack for holding said lever at different adjustments, vertical guides for said hood, a reel journaled in said hood, means for driving said reel including gearing and telescopic shafts, and trap pans below said reel for catching insects.

3. An insect destroying machine comprising a hanger frame provided with screen side members forming a longitudinal channel, a rod journaled in one side of said frame and provided with arms rigid therewith and projecting approximately horizontally therefrom, a hood suspended from said arms, a lever rigid with said rod for raising and lowering said hood, a rack for holding said lever at different adjustments, vertical guides for said hood, a reel journaled in said hood, means for driving said reel, including a ground wheel and bearings therefor pivotally connected to said hanger frame and gearing including telescopic shafts driven from said ground wheel, and trap pans carried by said hanger frame for catching insects.

4. An insect destroying machine comprising a frame including a top and side members and screens attached to said side members and forming a longitudinal channel, a pivot rod journaled in said frame and provided with arms projecting horizontally therefrom, a screen hood suspended from said arms, a lever rigid with said rod for raising and lowering said screen hood, vertical rods rigid with said frame for guiding said hood in its vertical movement, a reel journaled in said hood, means for driving said reel, and means for catching insects.

In testimony whereof, I set my hand, this 14th day of June, 1922.

SAMUEL H. MANLY.